(12) United States Patent
Chang (10) Patent No.: US 10,406,945 B2
(45) Date of Patent: Sep. 10, 2019

(54) RECLINING MECHANISM OF SEAT (71) Applicant: HYUNDAI DYMOS INCORPORATED, Seosan-si, Chungcheongnam-do (KR)

(72) Inventor: Seung Hun Chang, Hwaseong-si (KR)

(73) Assignee: HYUNDAI DYMOS INCORPORATED, Seosan-si (KR)

(*) Notice: Subject to any disclaimer, the term of this patent is extended or adjusted under 35 U.S.C. 154(b) by 211 days.

(21) Appl. No.: 15/681,328

(22) Filed: Aug. 18, 2017

(65) Prior Publication Data
US 2017/0341539 A1 Nov. 30, 2017

Related U.S. Application Data (63) Continuation of application No. PCT/KR2016/005707, filed on May 30, 2016.

(30) Foreign Application Priority Data

Jul. 16, 2015 (KR) .................. 10-2015-0100866

(51) Int. Cl.
*B60N 2/22* (2006.01)
*B60N 2/225* (2006.01)
(Continued)

(52) U.S. Cl.
CPC ......... *B60N 2/2227* (2013.01); *B60N 2/2251* (2013.01); *B60N 2/236* (2015.04);
(Continued)

(58) Field of Classification Search
CPC .... B60N 2/2227; B60N 2/236; B60N 2/2251; B60N 2/2362; B60N 2/20; F16H 1/20;
(Continued)

(56) References Cited

U.S. PATENT DOCUMENTS 5,984,413 A * 11/1999 Baloche ............... B60N 2/2358
297/367 R
7,407,230 B1 * 8/2008 Luo ........................ B60N 2/236
297/367 R
(Continued)

FOREIGN PATENT DOCUMENTS

JP H07116037 5/1995
JP 2011509875 3/2011
(Continued)

OTHER PUBLICATIONS

International Search Report for International Application PCT/KR2016/005707, dated Aug. 10, 2016.

*Primary Examiner* — Mark R Wendell
(74) *Attorney, Agent, or Firm* — Burris Law, PLLC (57) ABSTRACT

A reclining mechanism of a seat is provided that includes a fixed flange, a mobile flange, and locking parts being placed on first guide seats of guide seats on a first side of the fixed flange to be slidable inwardly and outwardly between the guide protrusions. Each locking part includes a locking gear on an outer end and is configured to engage with the internal gear of the mobile flange when sliding outwardly, thereby inhibiting relative rotation between the mobile flange and the fixed flange. The reclining mechanism further includes a locking cam rotatably provided at a center of the fixed flange and sub-parts provided on second guide seats of the guide seats on the first side of the fixed flange to be slidable inwardly and outwardly between the guide protrusions, each of the sub-parts being divided into a first part and a second part by a slit.

13 Claims, 8 Drawing Sheets

(51) Int. Cl.
  *F16H 1/20*   (2006.01)
  *F16H 57/08*   (2006.01)
  *B60N 2/235*   (2006.01)
  *F16H 1/28*   (2006.01)

(52) U.S. Cl.
  CPC ............... *F16H 1/20* (2013.01); *F16H 57/08* (2013.01); *F16H 2001/2881* (2013.01)

(58) Field of Classification Search
  CPC ... F16H 57/08; F16H 57/12; F16H 2001/2881
  USPC .............................................. 297/354.1, 373
  See application file for complete search history.

(56) References Cited

U.S. PATENT DOCUMENTS

| | | | | |
|---|---|---|---|---|
| 7,552,971 | B1* | 6/2009 | Tarusawa | B60N 2/236 297/367 P |
| 7,703,852 | B2* | 4/2010 | Wahls | B60N 2/236 297/367 R |
| 8,251,451 | B2* | 8/2012 | Dziedzic | B60N 2/236 297/366 |
| 8,708,412 | B2* | 4/2014 | Berndtson | B60N 2/236 297/367 L |
| 9,296,315 | B2* | 3/2016 | Hellrung | B60N 2/236 |
| 9,902,297 | B2* | 2/2018 | Robinson | B60N 2/236 |
| 2005/0168034 | A1* | 8/2005 | Fast | B60N 2/236 297/367 R |
| 2006/0055222 | A1* | 3/2006 | Bonk | B60N 2/236 297/367 R |
| 2007/0040436 | A1* | 2/2007 | Oki | B60N 2/236 297/367 R |
| 2009/0243363 | A1* | 10/2009 | Tarusawa | B60N 2/236 297/367 P |
| 2014/0284984 | A1* | 9/2014 | Yamada | B60N 2/2358 297/366 |
| 2015/0084392 | A1* | 3/2015 | Chang | B60N 2/2356 297/367 R |
| 2016/0009201 | A1* | 1/2016 | Kim | B60N 2/22 297/366 |
| 2016/0023577 | A1* | 1/2016 | Yamada | B60N 2/2227 297/367 R |

FOREIGN PATENT DOCUMENTS

| | | |
|---|---|---|
| JP | 2012176198 | 9/2012 |
| KR | 100637573 | 10/2006 |
| KR | 1020070032732 | 3/2007 |
| KR | 100904369 | 6/2009 |
| KR | 20130101764 | 9/2013 |
| KR | 101393603 | 5/2014 |
| WO | 2014/146194 | 9/2014 |

\* cited by examiner

RECLINING MECHANISM OF SEAT

CROSS-REFERENCE TO RELATED APPLICATIONS

This application is a continuation of International Application No. PCT/KR2016/005707 filed on May 30, 2016, which claims the benefit of KR 10-2015-0100866, filed on Jul. 16, 2015. The disclosures of the above applications are incorporated herein by reference.

FIELD

The present disclosure relates to reclining mechanisms and more particularly to reclining mechanisms for use in seats.

BACKGROUND

The statements in this section merely provide background information related to the present disclosure and may not constitute prior art.

The seat provided in transportation devices such as a vehicle includes a seat back for supporting the upper body of the passenger, a seat cushion for supporting the lower body such as the buttocks and thighs, and a headrest for supporting the back of the head, wherein at a junction of the seat back and the seat cushion, a reclining device is mounted, which allows the angle of the seat back to be adjusted relative to the seat cushion.

The reclining device is divided into a manual-type reclining device, in which the angle of the seat back is adjusted by the passenger manipulating a lever, and a power-type reclining device, which is automatically operated by the power of a motor through manipulating a switch, and all reclining devices, regardless of how they work, have strong coupling between components during the reclining operation to maintain passenger comfort and provide passenger safety.

In other words, the reclining device includes a component coupled with the seat back and a component coupled with the seat cushion and the two components exert a strong engagement force during the reclining operation. If the seat back has a weak engagement force, the angle of the seat back may be easily changed even with minor impact. In this case, the angle of the seat back is changed when an impact occurs, so that the passenger is injured.

As described above, in order for the reclining device to have a strong engagement force, clearance occurrence between components that are engaged with each other should be inhibited as much as possible. Further, in order to inhibit the seat back from moving as much as possible when the vehicle unstably moves under seated conditions, the operational clearance occurrence should be inhibited as much as possible in the locked state.

Meanwhile, in order to remove clearance in the locked state, there has been disclosed a document of Korean Patent Application Publication No. 10-2007-0032732 A, which is configured such that a pawl that is pushed by a cam rotated at the center and engaged with an external gear is divided into two parts, and the two divided pawls simultaneously come into contact with the cam so as to be pressed by the support of the cam.

However, in the above conventional configuration, the second pawl is pressed in the state where the first pawl is engaged with the external gear, thereby removing a clearance using principle of a wedge, wherein the second pawl functioning as the wedge is slightly pushed and moved, whereby the first pawl is also moved to be engaged. Accordingly, the first and second pawls are moved in real time during the process of engagement and clearance removal, so unless the cam that presses the pawl is elaborately designed, the wedge may be weak or the engagement may become loose.

The conventional configuration is further problematic in that it is difficult to guarantee the durability against clearance when any one of the first and second pawls is worn by repetitive use.

SUMMARY

The present disclosure provides a reclining mechanism of a seat, which is capable of securely achieving clearance removal in the locked state and obtaining sufficient strength, simultaneously.

According to one aspect of the present disclosure, there is provided a reclining mechanism of a seat, which includes: a fixed flange provided on a first side thereof with a plurality of guide protrusions being spaced apart from each other, with guide seats being defined between the guide protrusions; a mobile flange coupled with the fixed flange to be rotatable relative to the fixed flange, and provided with an internal gear along an inner circumference thereof; locking parts being placed on first guide seats of the guide seats on the first side of the fixed flange to be slidable inwardly and outwardly between the guide protrusions and functioning as main parts, with a locking gear being formed on an outer end of each of the locking parts, and being configured to be engaged with the internal gear of the mobile flange when sliding outwardly, thereby inhibiting relative rotation between the mobile flange and the fixed flange; a locking cam rotatably provided at a center of the fixed flange, with a plurality of cam protrusions being formed along an outer circumference thereof, and configured such that first cam protrusions of the cam protrusions press inner ends of the respective locking parts when rotating, thereby pressing the locking parts outwardly; and sub-parts provided on respective second guide seats of the guide seats on the first side of the fixed flange to be slidable inwardly and outwardly between the guide protrusions, each of the sub-parts being divided into a first part and a second part by a slit, with a sub gear being formed on an outer end of the first part to be engaged with the internal gear of the mobile flange, and with a pressed part being formed on an inner end of the second part to be pressed by second cam protrusions of the cam protrusions of the locking cam, wherein when the second part of each of the sub-parts presses the first part, the first part is completely engaged with the internal gear of the mobile flange, and the second part is wedged between the first part and the guide protrusions, thereby removing a clearance between the first and second parts.

The slit of each of the sub-parts may be formed in a diagonal direction to induce the second part to be wedged between the first part and the guide protrusions.

The slit of each of the sub-parts may be constituted by a diagonal section and a straight section, and the straight section may be formed in a longitudinal direction at a location where the sub-part comes into contact with the locking cam.

The second part of each of the sub-parts may be formed in a wedge shape with a width thereof being gradually reduced toward a radial outward direction by a diagonal section of the slit.

When the locking cam rotates, only the second part of each of the sub-parts may come into contact with the locking cam, and the first part of each of the sub-parts may be completely engaged with the internal gear by the locking cam pressing the second part, whereby the second part removes the clearance.

When the locking cam rotates, the first part of each of the sub-parts firstly may come into contact with the locking cam and slides toward the internal gear, and when the locking cam further rotates, the second part of each of the sub-parts may be pressed by the locking cam and the first part may be completely engaged with the internal gear, whereby the second part removes the clearance.

Each of the sub-parts may be configured such that opposite sides thereof are formed to be straight, with the guide protrusions coming into contact with the opposite sides defined between an outer end and an inner end of each of the sub-parts.

Opposite sides of each of the second guide seats of the fixed flange, where the respective sub-parts are seated, may be formed to be straight to correspond to the sub-parts.

Each of the locking parts may be configured such that the outer end thereof formed with the locking gear has a width wider than a width of the inner end thereof coming into contact with the locking cam.

The sub gear of each of the sub-parts, in one form, may have the number of teeth smaller than that of teeth of the locking gear of each of the locking parts.

Alternatively, the sub gear of each of the sub-parts may have teeth with the same size.

The locking gear of each of the locking parts, in one form, may be configured such that a thickness of each tooth varies.

Alternatively, the locking gear of the locking part may be configured such that the thickness of each tooth is gradually reduced toward a radial outward direction.

The sub-parts may be respectively seated on a pair of guide seats formed at locations symmetrically opposed to each other, of the guide seats of the fixed flange.

According to the reclining mechanism of a seat of the present disclosure, configured as described above, it is possible to securely achieve clearance removal in the locked state and obtain sufficient strength, simultaneously.

In other words, by designing the number of teeth on the clearance removal side as small as possible, the size of each tooth can be equal to the size of the mobile flange, thereby providing the clearance removal function.

Further, since the gear for clearance removal is designed to be divided by an effective slit, it is possible to advance the timing of the clearance removal through vertical movement of a wedge without resistance, and as a result, it is possible to perform speedy locking.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, exemplary forms of the present disclosure will be described in detail with reference to the accompanying drawings.

Figure 1:
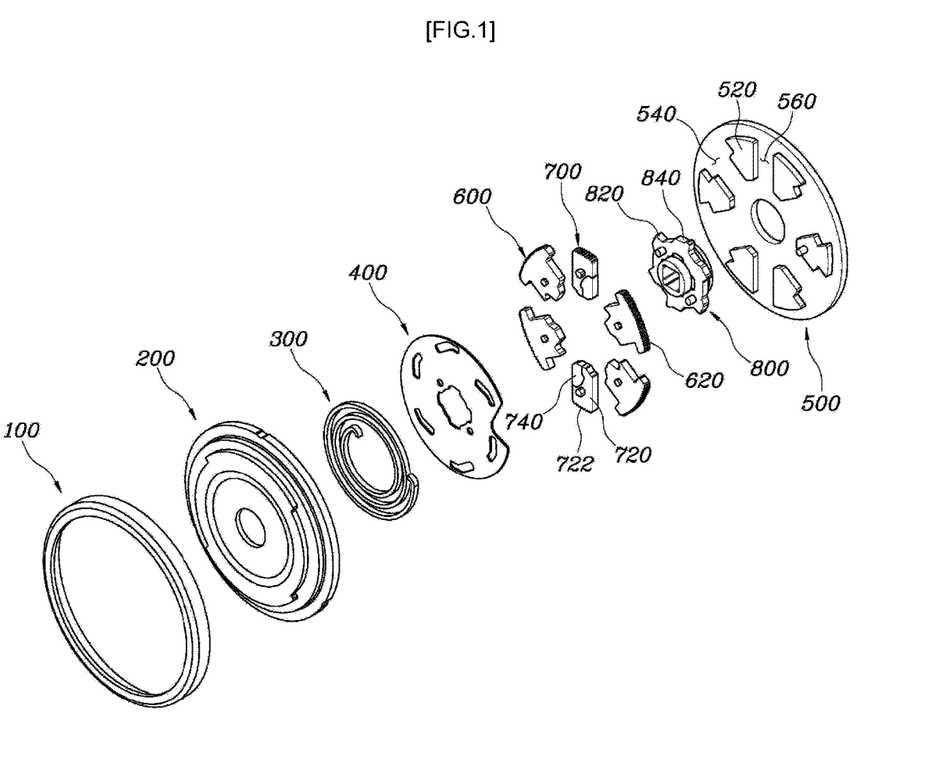
FIG. 1 is an exploded perspective view showing a reclining mechanism of a seat according to the teachings of the present disclosure.

As shown in FIG. 1, a reclining mechanism of a seat of the present disclosure may be roughly constituted by a fixed flange 500 fixed at a first side of a seat back or a seat cushion, and a mobile flange 200 fixed at a second side thereof. Further, the fixed flange 500 and the mobile flange 200 may be coupled to be rotatable relative to each other, wherein coupling between two flanges is implemented by a retainer 100 that surrounds the flanges.

Meanwhile, the mobile flange 200 and the fixed flange 500 form an inner space in the state where they are coupled to each other. In the space, technical configurations for reclining and locking are provided.

The angle of the seat back relative to the seat cushion is adjusted through reclining, and after reclining, locking is performed, wherein the locking is performed by locking parts 600 that are provided inside the seat and function as main parts. An inner circumference of the mobile flange 200 is formed with a continuous internal gear 220 in a ring gear type. Further, in the state where the locking is released, the mobile flange 200 and the fixed flange 500 are freely rotatable relative to each other.

Further, during the locking, the locking parts 600 slide in a radial outward direction and are engaged with the internal gear 220, whereby the mobile flange 200 and the fixed flange 500 are tightly coupled to each other with their positions fixed.

As described above, after reclining, a configuration, which presses the locking parts 600 outwardly during the locking, is desired, and a locking cam 800 serves the role, wherein the locking cam 800 is rotated by a spring 300. Further, each of the locking parts 600 is connected with a control plate 400 by a groove-protrusion structure. When the locking cam 800 is rotated, the control plate 400 is also rotated, thereby securing sliding of the locking parts 600.

To be more specific, FIGS. 2 to 5 are views showing various modifications of the reclining mechanism of a seat according to the various forms of the present disclosure, and the reclining mechanism of a seat according to the present disclosure includes: a fixed flange 500 provided on a first side thereof with a plurality of guide protrusions 520 being spaced apart from each other, with guide seats 540 and 560 being defined between the guide protrusions 520; a mobile flange 200 coupled with the fixed flange 500 to be rotatable relative to the fixed flange, and provided with an internal gear 220 along an inner circumference thereof; locking parts 600 being placed on first guide seats 540 of the guide seats on the first side of the fixed flange 500 to be slidable inwardly and outwardly between the guide protrusions 520 and functioning as main parts, with a locking gear 620 being formed on an outer end of each of the locking parts, and being configured to be engaged with the internal gear 220 of the mobile flange 200 when sliding outwardly, thereby inhibiting relative rotation between the mobile flange 200 and the fixed flange 500; a locking cam 800 rotatably provided at a center of the fixed flange 500, with a plurality of cam protrusions 820 and 840 being formed along an outer circumference thereof, and configured such that first cam protrusions 820 of the cam protrusions press inner ends of the respective locking parts 600 when rotating, thereby pressing the locking parts 600 outwardly; and sub-parts 700 provided on respective second guide seats 560 of the guide seats on the first side of the fixed flange 500 to be slidable inwardly and outwardly between the guide protrusions 520, each of the sub-parts being divided into a first part 720 and a second part 740 by a slit L1, L2, with a sub gear 722 being formed on an outer end of the first part 720 to be engaged with the internal gear 220 of the mobile flange 200, and with a pressed part 742 being formed on an inner end of the second part 740 to be pressed by second cam protrusions 840 of the cam protrusions of the locking cam 800, wherein when the second part 740 of each of the sub-parts 700 presses the first part 720, the first part 720 is completely engaged with the internal gear 220 of the mobile flange 200, and the second part 740 is wedged between the first part 720 and the guide protrusions 520, thereby removing a clearance between the first and second parts.

The fixed flange 500 is provided on the first side thereof with a plurality of guide protrusions 520 being spaced apart from each other, and the guide seats 540 and 560 are defined between the guide protrusions 520. Further, the mobile flange 200 is coupled with the fixed flange 500 to be rotatable relative to the fixed flange, and is provided with the internal gear 220 along the inner circumference thereof.

Meanwhile, the locking parts 600 are placed on the fixed flange 500, are selectively engaged with the mobile flange 200, and define reclining or a locked state. The locking parts 600 are placed on first guide seats 540 of the guide seats on the first side of the fixed flange 500 to be slidable inwardly and outwardly between the guide protrusions 520. Further, the outer end of each of the locking parts 600 is formed with the locking gear 620, and the locking parts are engaged with the internal gear 220 of the mobile flange 200 when sliding outwardly, thereby inhibiting relative rotation between the mobile flange 200 and the fixed flange 500. When the locking parts 600 slide in an inward radial direction, the locking is released and the mobile flange 200 and the fixed flange 500 are allowed to be rotated relative to each other, whereby it is possible to freely adjust a reclining angle.

Further, the locking cam 800 is rotatably provided at the center of the fixed flange 500, and is configured to be rotated in conjunction with a user's lever provided outside. Further, a plurality of cam protrusions 820 and 840 is formed along an outer circumference of the locking cam 800, wherein when the locking cam 800 is rotated, the first cam protrusions 820 of the cam protrusions press inner ends of the respective locking parts 600, thereby pressing the locking parts 600 outwardly, whereby the locking parts 600 are engaged with the internal gear 220 of the mobile flange 200 while sliding outwardly from the guide seats 540.

In particular, the sub-parts 700 of the present disclosure perform locking along with the locking parts 600, and remove the clearance simultaneously. To be more specific, the sub-parts 700 are provided on the respective second guide seats 560 of the guide seats on the first side of the fixed flange 500 to be slidable inwardly and outwardly between the guide protrusions 520. Further, each of the sub-parts is divided into the first part 720 and the second part 740 by the slit L1, L2.

The outer end of the first part 720 is formed with the sub gear 722 to be engaged with the internal gear 220 of the mobile flange 200, and the inner end of the second part 740 is formed with the pressed part 742 to be pressed outwardly by the second cam protrusions 840 of the locking cam 800.

Accordingly, when the locking cam 800 is rotated, the locking cam 800 presses the locking parts 600 to perform the main locking action and simultaneously presses the sub-parts 700. The second part 740 of each of the sub-parts 700 is configured such that the inner end thereof constitutes the pressed part 742, wherein the pressed part 742 of the inner end is pressed outwardly by the second cam protrusions 840 of the locking cam 800. Further, the first part 720 is pressed by the second part 740, and at a similar time, the first part 720 is pressed outwardly, the sub gear 722 is engaged with the internal gear 220, the second part 740 serves as a wedge, such that the first part 720 is pressed toward the side of the guide seats 560, thereby removing the clearance.

In other words, when the second part 740 of each of the sub-parts 700 presses the first part 720, the first part 720 is completely engaged with the internal gear 220 of the mobile flange 200, and the second part 740 is wedged between the first part 720 and the guide protrusions 520, whereby the clearance can be removed.

As described above, the main locking force of the present disclosure is realized through the locking parts 600, and the clearance removal is realized through the sub-parts 700, so that both locking strength and clearance removal can be reliably achieved.

Further, the sub-parts 700 are not performed in a conventional way to simply remove the clearance by pressing the locking parts 600 sideways. Gears are substantially formed on the sub-parts 700 and engaged with the mobile flange 200, so that the clearance can be more reliably removed compared with the conventional simple clearance removal through the configuration of the gear engagement for the clearance. In particular, the second part 740 without being formed with gears serves as a wedge, and the first part 720 is actually engaged with the mobile flange through pressing the second part 740, whereby the clearance can be reliably removed in the engaged state.

If the engagement part and the clearance removal part of each of the sub-parts 700 are configured to be separate, even though the sub-parts 700 are engaged, the clearance may not be removed completely. On the contrary, in the present disclosure, the engagement is progressed by removing the clearance, and the clearance is removed by pressing to the last situation where clearance can no longer be removed, whereby a slight clearance is not allowed unless the sub-parts 700 or the locking cam 800 is broken.

Meanwhile, as shown in FIGS. 2 to 5, the slit L1, L2 of each of the sub-parts 700 may be formed in a diagonal direction to induce the second part 740 to be wedged between the first part 720 and the guide protrusions 520. The sub-parts 700 may be configured to be in various shapes, but in common, each of the sub-parts 700 is divided into the first part 720 and the second part 740 by a diagonal slit. Further, the slit of each of the sub-parts 700 may be constituted by a diagonal section L2 and a straight section L1, and the straight section L1 may be formed in a longitudinal direction at a location where the sub-part comes into contact with the locking cam 800.

Meanwhile, the second part 740 of each of the sub-parts 700 may be formed in a wedge shape with a width thereof being gradually reduced toward a radial outward direction by the diagonal section L2 of the slit.

Through the above configuration, the straight section L1 is formed at a location where the sub-part faces the locking cam 800, whereby the first part 720 and the second part 740 are distinguished by the straight section L1, and accordingly, when the locking cam 800 and the pressed part 742 firstly come into contact with each other, the second part 740 is rapidly pressed and moved upward through the linear motion.

Figure 2:
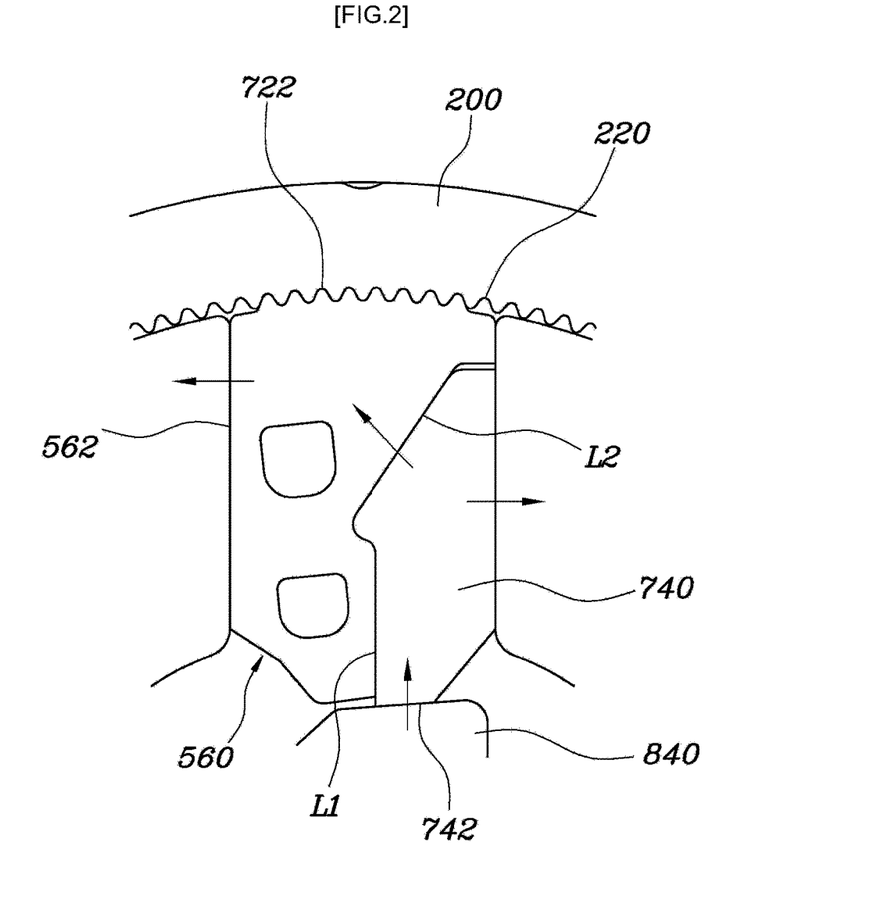
FIG. 2 illustrates a reclining mechanism of a seat according to the present disclosure.
Figure 3:
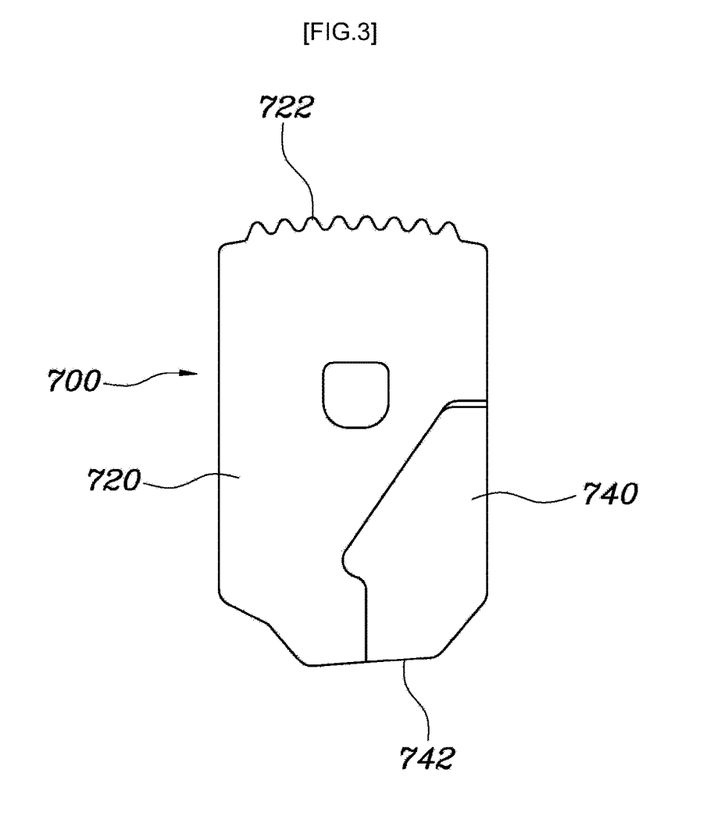
FIG. 3 illustrates one form of a sub-part according to the present disclosure.
Figure 4:
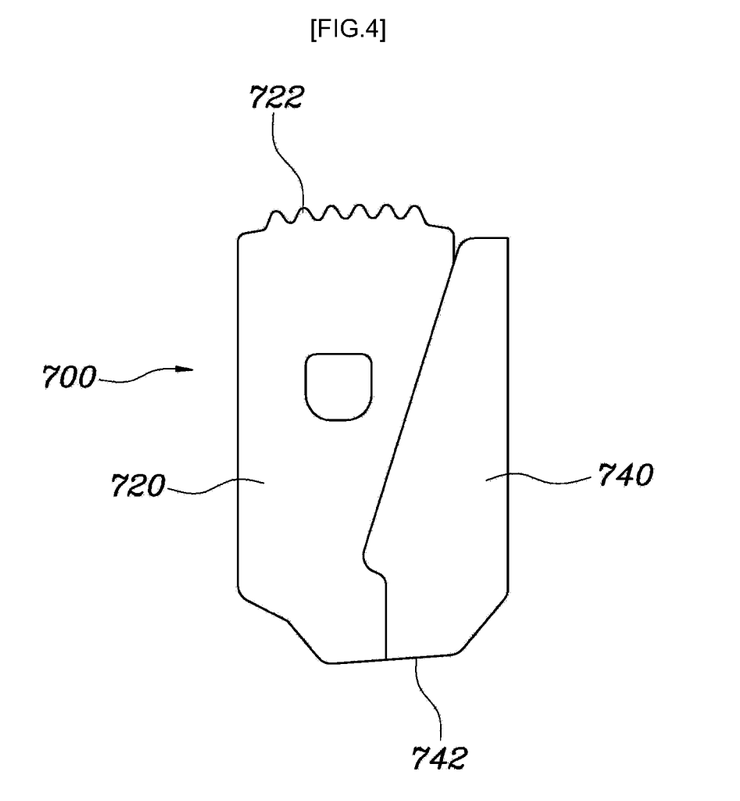
FIG. 4 illustrates another form of a sub-part according to the present disclosure.
Figure 5:
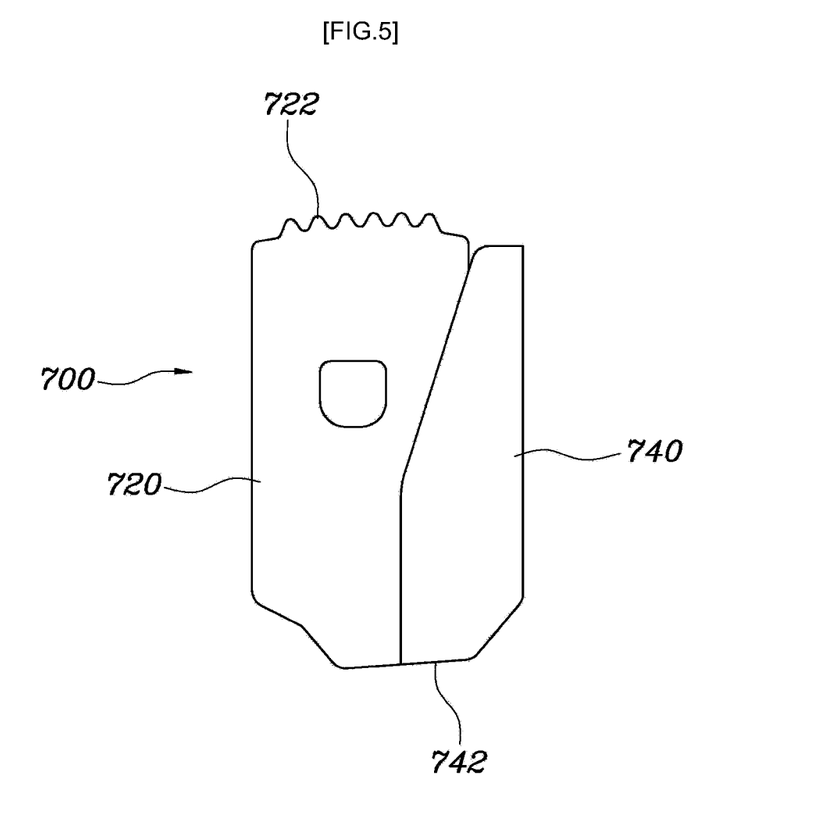
FIG. 5 illustrates yet another form of a sub-part according to the present disclosure.

Further, after the straight section L1, the sub part is divided by the diagonal section L2, and the second part 740 is formed in a wedge shape with a width thereof being gradually reduced, and through this, the second part 740 is naturally wedged between the first part 720 and the guide protrusions 520, thereby functioning as a wedge, and at the same time, through the diagonal line, the first part 720 is pressed upward, such that the first part 720 is engaged with the mobile flange. As shown in FIG. 2, the first part 720 is engaged by being indirectly pressed by the second part 740, but not by being directly pressed by the locking cam 800.

In other words, in the various forms of FIGS. 2 to 5, when the locking cam 800 is rotated, only the second part 740 of each of the sub-parts 700 comes into contact with the locking cam 800, and the first part 720 of each of the sub-parts is completely engaged with the internal gear by the locking cam 800 pressing the second part 740, whereby the second part 740 removes the clearance.

Figure 6:
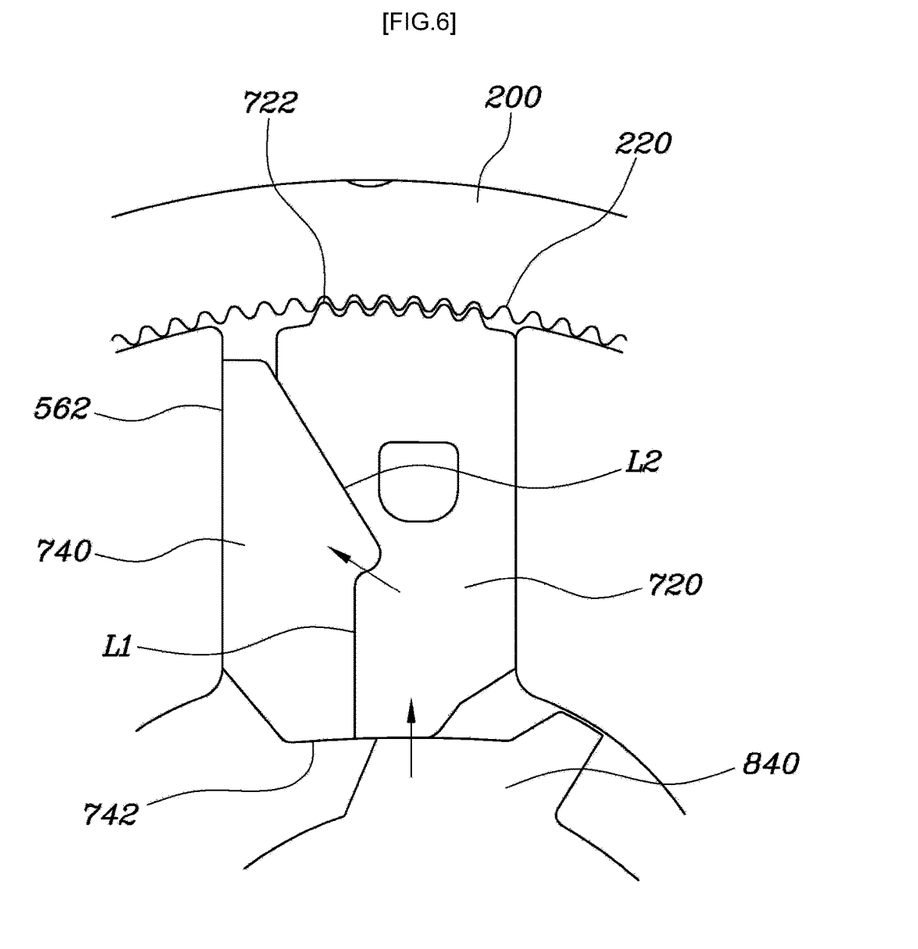
FIGS. 6 and 7 are views showing an operational procedure of a reclining mechanism of a seat according to the present disclosure.
Figure 7:
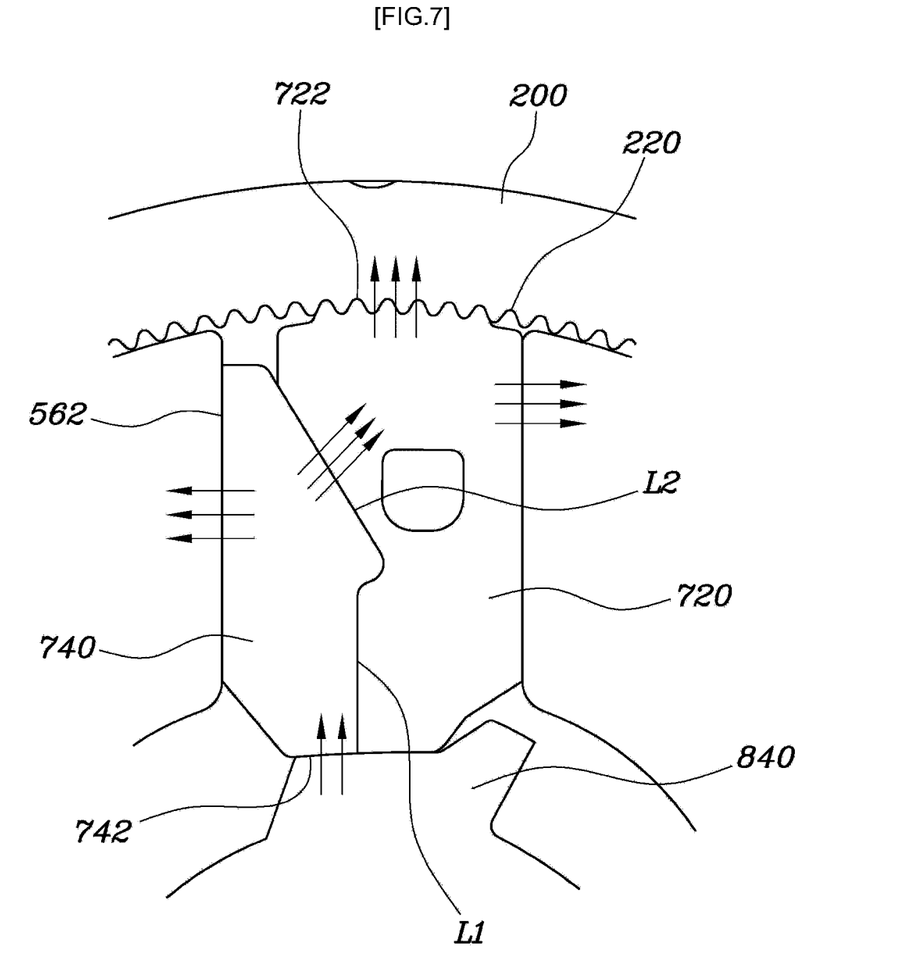

Meanwhile, FIGS. 6 to 7 are views showing an operational procedure of the reclining mechanism of a seat according to the present disclosure, and in this case, when the locking cam 800 is rotated, the first part 720 of each of the sub-parts 700 firstly comes into contact with the locking cam 800 and slides toward the internal gear 220, and when the locking cam 800 is further rotated, the second part 740 is pressed by the locking cam 800 and the first part 720 is completely engaged with the internal gear 220, whereby the second part 740 removes the clearance.

In other words, when the locking cam 800 is rotated, the first part 720 firstly comes into contact with the locking cam 800. In this case, the first part 720 may firstly slide toward the internal gear 220 of the mobile flange 200. However, even in this case, the moment of engagement is when the second part 740 presses the first part 720. In other words, even if the locking cam 800 firstly comes into contact with the first part 720, as the locking cam 800 is rotated further, the locking cam 800 presses the second part 740, whereby the first part 720 is pressed by the second part 740 and is completely engaged with the internal gear 220.

Ultimately, the first part 720 is not engaged directly with the mobile flange, but is completely engaged therewith by being pressed by the second part 740, which allows the clearance removal and the completeness of the engagement. In other words, upward moving of the second part 740 for clearance removal continues until when the engagement of the first part 720 no longer proceeds, whereby the clearance is completely removed.

Meanwhile, each of the sub-parts 700 may be configured such that opposite sides thereof are formed to be straight, with the guide protrusions coming into contact with the opposite sides defined between an outer end and an inner end of each of the sub-parts. Accordingly, opposite sides of each of the second guide seats 560 of the fixed flange 500, where the respective sub-parts 700 are seated, may be formed to be straight to correspond to the sub-parts 700.

Meanwhile, each of the locking parts 600 may be configured such that the outer end thereof formed with the locking gear 620 has a width wider than that of the inner end thereof coming into contact with the locking cam 800.

In the above case, each of the locking parts 600 has a long engagement length, but in the sub-parts 700, the engagement length should be shorter. This is because the mobile flange 200 and the fixed flange 500 are engaged in a relatively rotating state, so if the engagement length is long, the size of the teeth is different for each section, whereby the locking gears 620 of the entire locking parts 600 are not fully engaged with the internal gear 220 in some sections.

However, if this case is applied to the sub-parts 700, the sub-parts 700 may be somewhat shaken in a state where the sub-parts 700 are engaged, and as a result, the clearance may not be completely removed. Accordingly, the sub-parts 700 have the short engagement length to remove the clearance, and as a result, the teeth have the same size, and when the clearance is removed, all the teeth come into complete close contact with the internal gear 220, thereby stably removing the clearance. Instead, since the locking parts 600 have long engagement lengths, the coupling strength is accomplished in the locking parts 600.

Thereby, the sub gear 722 of each of the sub-parts 700 may have the number of teeth smaller than that of teeth of the locking gear 620 of each of the locking parts 600, and as shown in the drawings, the number of teeth of the sub gear be about 10. Further, in one form of the present disclosure, the sub gear 722 of each of the sub-parts 700 may have teeth with the same size. Thereby, the sub gears are engaged with the internal gear 220 areas and are not shaken.

Meanwhile, in one form, the locking gear 620 of each of the locking parts 600 may have about 20 teeth and may be configured such that a thickness of each tooth varies. Further in another form, the locking gear 620 of each of the locking parts 600 may be configured such that the thickness of each tooth is gradually reduced toward a radial outward direction. Through this configuration, the locking gear 620 smoothly comes into contact with the internal gear 220 and is engaged with the internal gear 220 at various angles through the long length, thereby inhibiting locking stability and engagement. Further, the sub-parts 700 are tightly engaged with the internal gear 220 in a narrow area, thereby not allowing the clearance to occur.

Figure 8:
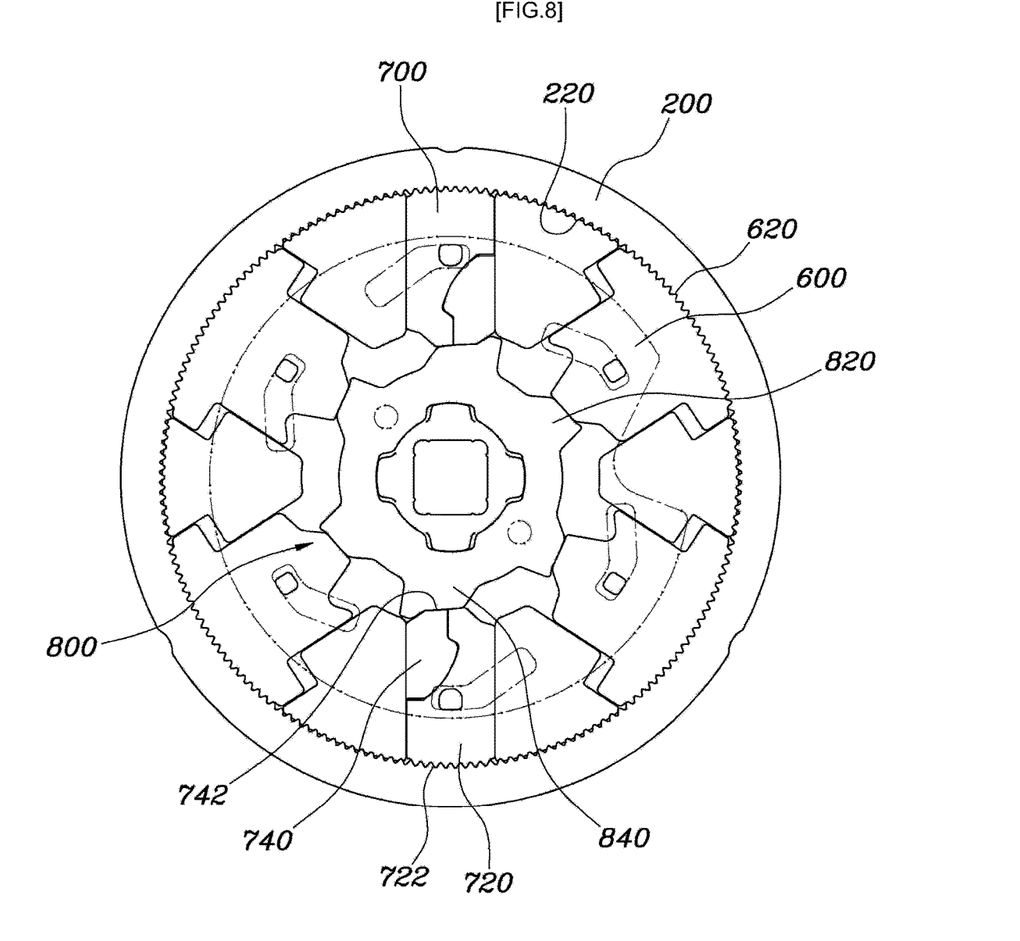
FIG. 8 is a sectional view showing a reclining mechanism of a seat according to the present disclosure.

Meanwhile, as shown in FIG. 8, the sub-parts 700 may be respectively seated on a pair of guide seats 560 formed at locations symmetrically opposed to each other, of the guide seats of the fixed flange 500. Through this configuration, the sub-parts remove respective clearances at the opposed locations, whereby clearances are removed throughout the sections, and at the remaining angles, the locking parts 600 are locked respectively, whereby stable engagement is maintained.

According to the reclining mechanism of a seat of the present disclosure as described above, it is possible to securely achieve clearance removal in the locked state and obtain sufficient strength, simultaneously.

In other words, by designing the number of teeth on the clearance removal side as small as possible, the size of each tooth can be equal to the size of the mobile flange, thereby inhibiting the clearance removal function.

Further, since the gear for clearance removal is designed to be divided by an effective slit, it is possible to advance the timing of the clearance removal through vertical movement of a wedge without resistance, and as a result, it is possible to perform speedy perfect locking.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A reclining mechanism of a seat, the reclining mechanism comprising:
a fixed flange including a first side having a plurality of guide protrusions being spaced apart from each other, and guide seats defined between the guide protrusions;
a mobile flange coupled with the fixed flange to be rotatable relative to the fixed flange, and having an internal gear along an inner circumference;
locking parts disposed on first guide seats of the guide seats on the first side of the fixed flange to be slidable inwardly and outwardly between the guide protrusions and functioning as main parts, with a locking gear being formed on an outer end of each of the locking parts, and configured to engage with the internal gear of the mobile flange when sliding outwardly thus inhibiting relative rotation between the mobile flange and the fixed flange;
a locking cam rotatably disposed at a center of the fixed flange, the locking cam including a plurality of cam protrusions formed along an outer circumference of the locking cam and configured such that first cam protrusions of the cam protrusions press inner ends of the respective locking parts when rotating, thereby pressing the locking parts outwardly; and
sub-parts provided on respective second guide seats of the guide seats on the first side of the fixed flange, the sub-parts configured to be slidable inwardly and outwardly between the guide protrusions, each of the sub-parts being divided into a first part and a second part by a slit, with a sub gear being formed on an outer end of the first part to be engaged with the internal gear of the mobile flange, and with a pressed part being formed on an inner end of the second part to be pressed by second cam protrusions of the cam protrusions of the locking cam,
wherein when the second part of each of the sub-parts presses the first part, the first part is completely engaged with the internal gear of the mobile flange, and the second part is wedged between the first part and the guide protrusions, thereby removing a clearance between the first and second parts,
wherein the slit of each of the sub-parts is defined by a diagonal section and a straight section, and the straight section is formed in a longitudinal direction at a location where the sub-part comes into contact with the locking cam.

2. The reclining mechanism of claim 1, wherein the slit of each of the sub-parts defined by the diagonal direction induces the second part to be wedged between the first part and the guide protrusions.

3. The reclining mechanism of claim 1, wherein the second part of each of the sub-parts defines a wedge shape with a width gradually reduced toward a radial outward direction by the diagonal section of the slit.

4. The reclining mechanism of claim 1, wherein when the locking cam rotates, the second part of each of the sub-parts comes into contact with the locking cam, and the first part of each of the sub-parts is completely engaged with the internal gear by the locking cam pressing the second part, wherein the second part removes the clearance.

5. The reclining mechanism of claim 1, wherein when the locking cam rotates, the first part of each of the sub-parts firstly comes into contact with the locking cam and slides toward the internal gear, and when the locking cam further rotates, the second part of each of the sub-parts is pressed by the locking cam and the first part is completely engaged with the internal gear, wherein the second part removes the clearance.

6. The reclining mechanism of claim 1, wherein each of the sub-parts is configured such that opposite sides are formed straight, wherein the guide protrusions coming into contact with the opposite sides defined between an outer end and an inner end of each of the sub-parts.

7. The reclining mechanism of claim 6, wherein opposite sides of each of the second guide seats of the fixed flange, where the respective sub-parts are seated, are straight to correspond to the sub-parts.

8. The reclining mechanism of claim 1, wherein each of the locking parts is configured such that the outer end has a width wider than a width of the inner end coming into contact with the locking cam.

9. The reclining mechanism of claim 1, wherein the sub gear of each of the sub-parts has a number of teeth smaller than a number of teeth of the locking gear of each of the locking parts.

10. The reclining mechanism of claim 1, wherein the sub gear of each of the sub-parts has teeth with a same size.

11. The reclining mechanism of claim 1, wherein the locking gear of each of the locking parts is configured such that a thickness of each tooth varies.

12. The reclining mechanism of claim 11, wherein the locking gear of the locking part is configured such that the thickness of each tooth is gradually reduced toward a radial outward direction.

13. The reclining mechanism of claim 1, wherein the sub-parts are respectively seated on a pair of guide seats of the guide seats of the fixed flange at locations symmetrically opposed to each other.

* * * * *